United States Patent [19]
Jensen et al.

[11] Patent Number: 5,333,708
[45] Date of Patent: Aug. 2, 1994

[54] COMPRESSION CUT-OFF VALVE FOR A HYDRAULIC DAMPER

[75] Inventors: Eric L. Jensen, Dayton; Rachel J. Belvo, Miamisburg; Randall L. Derr, Bellbrook, all of Ohio

[73] Assignee: General Motors Corporation, Detroit, Mich.

[21] Appl. No.: 2,554

[22] Filed: Jan. 11, 1993

[51] Int. Cl.$^5$ .............................................. F16F 9/49
[52] U.S. Cl. .................... 188/322.14; 188/284
[58] Field of Search .................... 188/322.14, 322.13, 188/315, 281, 284, 285

[56] References Cited

U.S. PATENT DOCUMENTS

| | | | |
|---|---|---|---|
| 4,185,356 | 1/1980 | Kuivalainen et al. | 188/284 X |
| 4,650,043 | 3/1987 | Eckersley | 188/322.14 |
| 4,768,629 | 9/1988 | Wössner | 188/322.14 X |
| 4,782,925 | 11/1988 | Grundei | 188/322.14 |

Primary Examiner—Robert J. Oberleitner
Assistant Examiner—Kevin D. Rutherford
Attorney, Agent, or Firm—A. Michael Tucker

[57] ABSTRACT

A twin-tube hydraulic damper includes a fluid-filled cylinder tube closed at its lower end by a cylinder end. A piston is slidably mounted in the cylinder tube and divides an interior volume of the cylinder tube into upper and lower chambers. A plurality of intake slots permit fluid to flow from a reservoir to the lower chamber. A plurality of exit flow openings permit fluid to flow from the lower chamber to the reservoir. A cut-off cap is slidably mounted on the cylinder end and sprung away from the cylinder end by a reaction spring. An annular wall formed on the cylinder end receives the cap as the piston engages an activation spring near the travel limit of a compression stroke. Reduced fluid flow through the exit flow openings increases the damping force to reduce harsh impacts.

7 Claims, 1 Drawing Sheet

COMPRESSION CUT-OFF VALVE FOR A HYDRAULIC DAMPER

BACKGROUND OF THE INVENTION

1. Field of the Invention

The present invention relates generally to vehicular suspensions systems, and in particular is concerned with a compression cut-off valve for a hydraulic damper.

2. Description of the Related Art

The use of hydraulic dampers in vehicular suspension systems is widespread. In general, hydraulic dampers (e.g., shock absorbers and struts) are used with suspension springs to attenuate vibrations received from wheel assemblies and body movements. Suspension travel of each damper is limited in both the compression (jounce) and extension (rebound) directions.

When the limit of compression and/or extension travel by a damper has been reached due to undulations in a road surface combined with insufficient levels of damping force, a suspension system may "bottom out" and transmit harsh vibrations to the body. Typical suspension systems cushion against the such vibrations with elastomeric bumpers at each end of travel. Such bumpers may be formed from natural rubber, urethane foam and solid urethane. Also, hydraulic cushion methods have been used to restrict fluid flow in a hydraulic damper to increase damping as the limit of travel is reached. Such methods involve techniques which do not easily lend themselves to implementation with a twin-tube damper.

The art continues to seek improvements. It is desirable to provide a position sensitive damper having increased damping as a travel limit is reached. Specifically, it is desirable to provide such a device for known twin-tube damper designs.

SUMMARY OF THE INVENTION

The present invention includes a position sensitive, twin-tube hydraulic damper having increased damping as a compression limit is reached. A compression cut-off valve is positioned at the lower end of a fluid-filled cylinder tube to control the flow of fluid between the cylinder and a reservoir. An activation spring of a predetermined length and rate can be tuned to provide increased damping by restricting fluid flow through the cut-off valve as the compression stroke limit is reached.

In a preferred embodiment, a twin-tube hydraulic damper includes a fluid-filled cylinder tube closed at its lower end by a cylinder end. A piston is slidably mounted in the cylinder tube and divides an interior volume of the cylinder tube into upper and lower chambers. A plurality of intake slots permit fluid to flow from a reservoir to the lower chamber. A plurality of exit flow openings permit fluid to flow from the lower chamber to the reservoir. A cut-off cap is slidably mounted on the cylinder end and sprung away from the cylinder end by a reaction spring. An annular wall formed on the cylinder end receives the cap as the piston engages an activation spring near the travel limit of a compression stroke. Reduced fluid flow through the exit flow openings increases the damping force to reduce harsh impacts.

DETAILED DESCRIPTION OF THE PREFERRED EMBODIMENT

Figure 2:
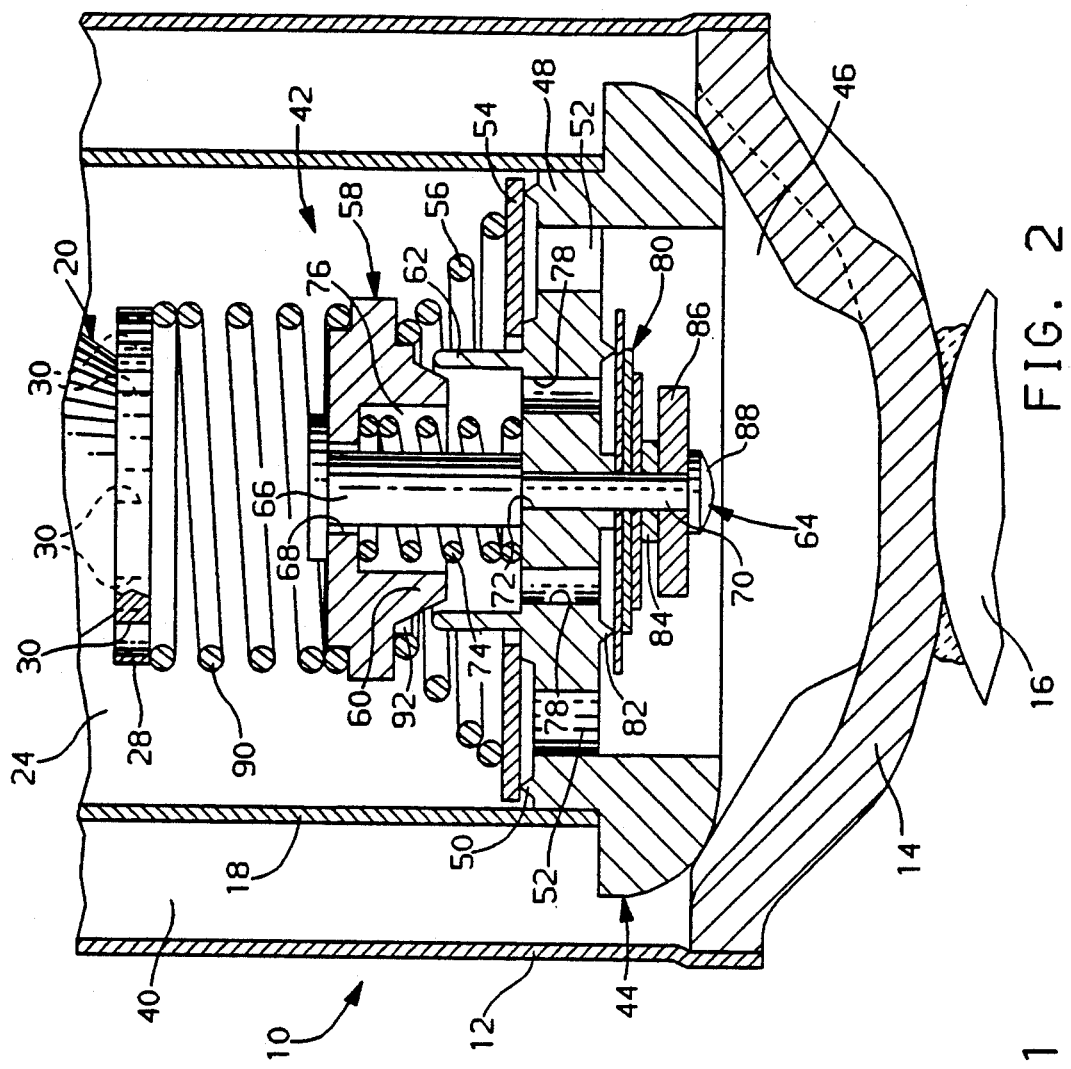
FIG. 2 is an enlarged view of the compression cut-off valve illustrating a cut-off cap biased away from an annular wall in an open position.
Figure 1:
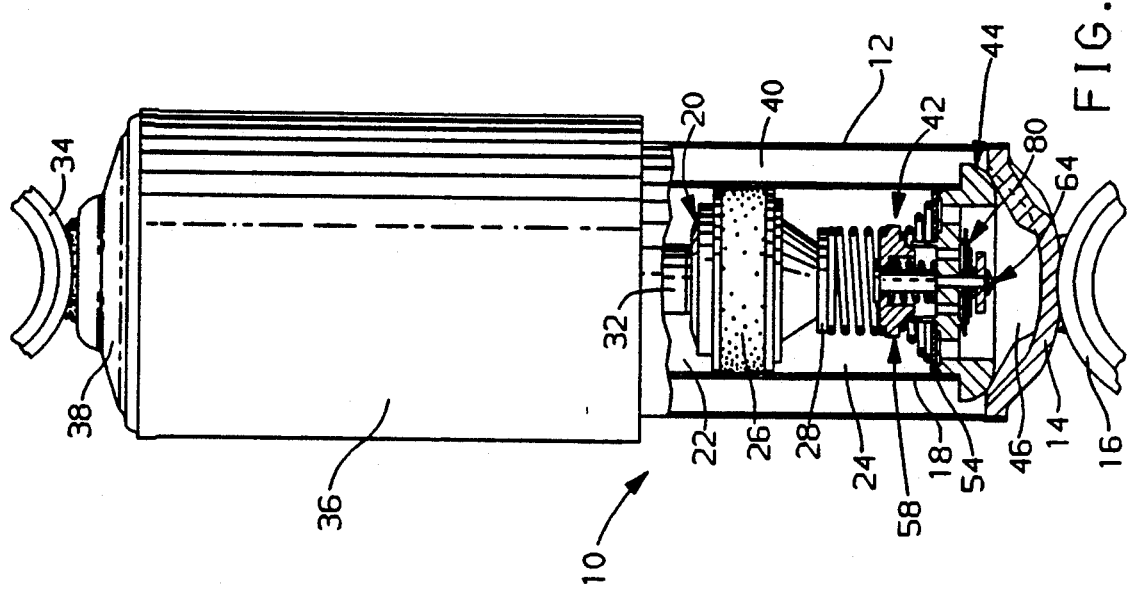
FIG. 1 is a elevational view of a twin-tube hydraulic damper with parts removed illustrating a preferred embodiment of a compression cut-off valve according to the present invention.

A twin-tube hydraulic damper, illustrated as a shock absorber, is indicated generally at 10 in FIG. 1. The damper 10 includes a reservoir tube 12 closed at its lower end by a base cup 14. A mounting bracket 16 is attached to the base cup 14 to permit the damper 12 to be mounted to an axle or other suspension support (not illustrated) in a well-known manner.

A fluid-filled cylinder tube 18 is concentrically mounted inside the reservoir tube 12. A piston 20 is slidable mounted inside the cylinder tube 18 and divides an interior volume of the cylinder tube 18 into an upper chamber 22 and a lower chamber 24. Preferably, a band 26 formed from a low-friction material is provided about the outer circumference of the piston 20. An internal piston valve assembly (not illustrated) is contained by the piston 20 and controls fluid flow between the upper and lower chambers 22, 24 as the piston 20 reciprocates due to road inputs transmitted to the damper 10 via the mounting bracket 16.

A piston stop 28 is formed as a thin rigid disc having a plurality of openings 30. The piston stop 28 is secured to a lower surface of the piston 20 in such a manner so as not to interfere with fluid flow through the piston valve assembly.

A piston rod 32 is secured at its lower end to the piston 20. An upper end of the piston rod 32 extends beyond the damper 10 and is attached to a mounting bracket 34. The mounting bracket 34 is used to attach the damper 10 to a vehicular body (not illustrated) in a well-known manner. A dust tube 36 is secured to a cover plate 38 and projects downwardly to cover the extended piston rod 32 during an extension stroke of the damper 10.

A fluid reservoir 40 is formed in the annular volume between the cylinder tube 18 and the reservoir tube 12. As the piston 20 reciprocates, fluid in the lower chamber 24 travels to and from the reservoir 40 via a compression cut-off valve assembly indicated generally at 42.

The assembly 42 includes a cylinder end 44 seated in the base cup 14 so that fluid communication is provided between a chamber 46 below the cylinder end 44 and the reservoir 40. An annular wall 48 is press fit into the lower end of the cylinder tube 18 to seal the lower chamber 24. An annular valve seat 50 is provided on an upper surface of the cylinder end 44 radially inside the cylinder tube 18. A plurality of intake openings 52 preferably formed as arcuate slots, are formed in the cylinder end 44 radially inwardly from the valve seat 50. A flexible intake disc valve 54 is biased on the valve seat 50 by an intake coil spring 56 seated at its upper end against a cut-off cap indicated generally at 58.

The cap 58 includes a downwardly projecting conical portion 60 which cooperates with an upwardly projecting annular wall 62 formed on the cylinder end 44 radially inwardly from the intake openings 52. A stepped rivet 64 includes a large diameter portion 66 received in a central opening 68 of the cap 58 and a small diameter portion 70 extending through a central opening 72 in the cylinder end 44. A reaction coil spring 74 encircles the large diameter portion 66 of the rivet 64 and is received in a chamber 76 in the cap 58 to bias the cap 58 upwardly away from contact with the annular wall 62. A plurality of exit flow openings 78 are provided in the cylinder end 44 radially inwardly from the annular wall 62. A plurality of flexible valve discs 80, seated on an annular valve seat 82 formed on a lower surface of the cylinder end 44 radially outwardly from the exit flow openings 78, are retained by the stepped rivet 64. Preferably, a spacer 84 and a retainer 86 are provided between the valve discs 80 a head 88 of the rivet 64.

An activation member 90 illustrated as a coil spring is seated on an upper surface of the cap 58. As described fully below, the piston stop 28 engages the activation member 90 to urge the cap 58 downwardly and reduce fluid flow through the exit flow openings 78 as the conical portion 60 engages the annular wall 62.

During a compression stroke of the damper 10, i.e., when cylinder end 44 moves toward the piston 20, fluid in the lower chamber 24 travels through the piston valve assembly to the upper chamber 22. Excess fluid equal to the volume of the piston rod 32 travels through the exit flow openings 78 and deflects the valve discs 80 to reach the reservoir 40. As the damper 10 travels toward the limit of its compression stroke, the piston stop 28 engages the activation member 90 to urge the cap 58 downwardly against the reaction spring 74. As the piston 20 reaches its limit, the spring force of the activation member 90 overcomes the force of the reaction spring 74 and reduces the clearance between the conical portion 60 and the annular wall 62, thereby restricting fluid flow. A restriction of fluid flowing from the lower chamber 24 to the reservoir 40 increases the damping force of the damper 10. Thus, the damper 10 provides an increase in the damping force as the limit of compression travel is approached. By increasing the damping force, impact forces from "bottoming out" can be reduced. Preferably, a flow passage 92 is provided in the cap 58 to prevent hydraulic lock (i.e., stoppage of fluid flow). In other embodiments, such a flow passage(s) can be provided in the annular wall 62.

During a rebound stroke, i.e., when the cylinder end 44 moves away from the piston 20, fluid from the upper chamber 22 returns to the lower chamber 24 through the piston valve assembly. Make-up fluid equal to the volume of the piston rod 32 returns to the lower chamber 24 from the reservoir 40 by deflecting the intake disc valve 54 against the intake spring 56. Also, the piston stop 28 disengages the activation member 90 so that the reaction spring 74 returns the cap 58 away from the annular wall 62.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A compression valve assembly for a vehicular suspension damper having a fluid-filled cylinder tube, the valve assembly comprising:
   (a) a cylinder end sealing a lower end of the cylinder tube;
   (b) a first plurality of openings in the cylinder end for fluid flowing into the cylinder tube;
   (c) means for controlling fluid flow through the first set of openings;
   (d) a second plurality of openings in the cylinder end for fluid flow out of the cylinder tube;
   (e) means for controlling fluid flow through the second set of openings including a cap sprung away from the second set of openings in an open position;
   (f) means for moving the cap to a second position to selectively reduce fluid flow through the second set of openings;
   (g) an annular wall formed on the cylinder end; and
   (h) a conical portion formed on the cap complementary to and receivable into the annular wall as the cap is moved to a second position.

2. The assembly specified in claim 1 wherein:
   (a) the annular wall is formed radially outbound of the second set of openings and radially inbound of the first set of openings;
   (b) the cap includes means for receiving a reaction spring to normally position the conical portion away from the annular wall; and
   (c) the cap is secured to the cylinder end by fastener means.

3. The assembly specified in claim 2 wherein the means for moving the cap to a second position is a spring mounted on the cap having sufficient spring force to overcome the reaction spring to move the cap to a second position.

4. The assembly in claim 1 including a flow passage provided between the cap and annular wall when the conical portion of the cap is seated on the wall.

5. A twin-tube hydraulic suspension damper comprising:
   (a) a reservoir tube sealed at a lower end by a base cup;
   (b) a fluid-filled cylinder tube concentrically mounted within the reservoir tube;
   (c) a fluid reservoir formed between the reservoir and cylinder tubes;
   (d) a piston slidably mounted inside the cylinder tube, dividing an interior of the cylinder tube into upper and lower chambers;
   (e) a piston stop provided on a lower surface of the piston;
   (f) a cylinder end sealing a lower end of the cylinder tube;
   (g) a plurality of intake openings formed in the cylinder end to selectively permit fluid flow from the reservoir to the lower chamber;
   (h) a valve disc seated on the cylinder end to control fluid flow through the intake openings;
   (i) a plurality of exit flow openings formed radially inwardly from the intake openings to selectively permit fluid flow from the lower chamber to the reservoir;
   (j) a cut-off cap slidably connected to the cylinder end by fastener means;
   (k) a reaction spring provided between the cut-off cap end and the cylinder end to hold the cap in a first position to permit flow through the exit flow openings;
   (l) an activation member of a predetermined length to move the cap to at least a second position to reduce flow through the exit flow holes when the piston stop engages the activation member;
   (m) a conical portion formed on the cap; and
   (n) an annular wall formed on the cylinder end radially outbound of the exit flow openings complementary to the conical portion of the cap.

6. The damper specified in claim 5 wherein the activation member is a spring.

7. The damper specified in claim 5 including a flow passage provided between the cap and annular wall when the conical portion of the cap is seated on the wall.

* * * * *